Figure 1:
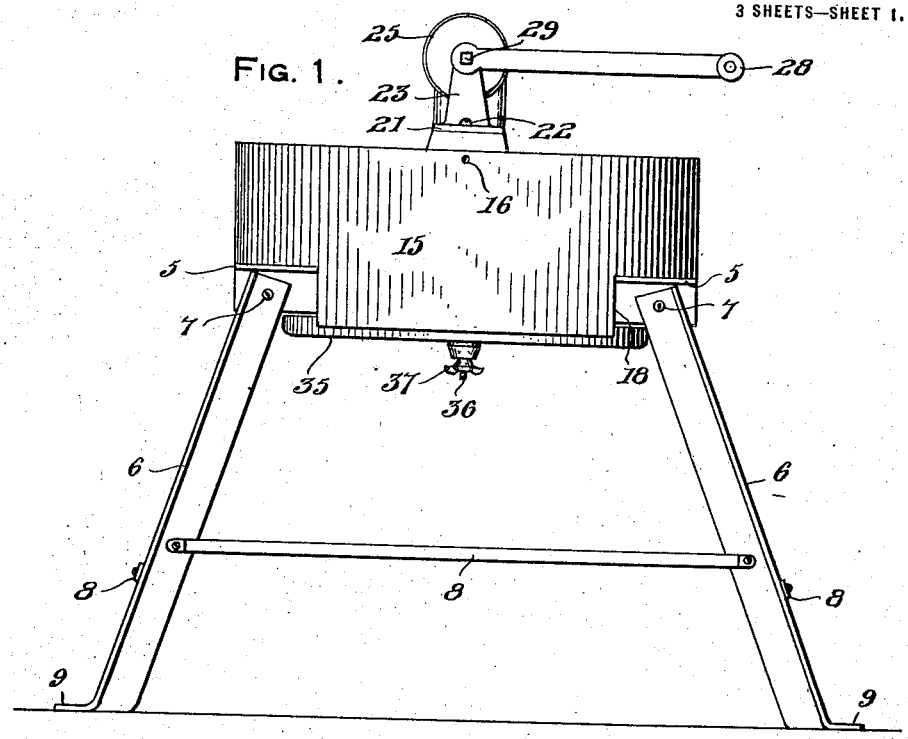

F. TURK.
VEGETABLE CUTTER.
APPLICATION FILED JULY 2, 1919.

1,351,357.

Patented Aug. 31, 1920.
3 SHEETS—SHEET 1.

Inventor
F. Turk

By

Attorney

F. TURK.
VEGETABLE CUTTER.
APPLICATION FILED JULY 2, 1919.
1,351,357.
Patented Aug. 31, 1920.
3 SHEETS—SHEET 2.
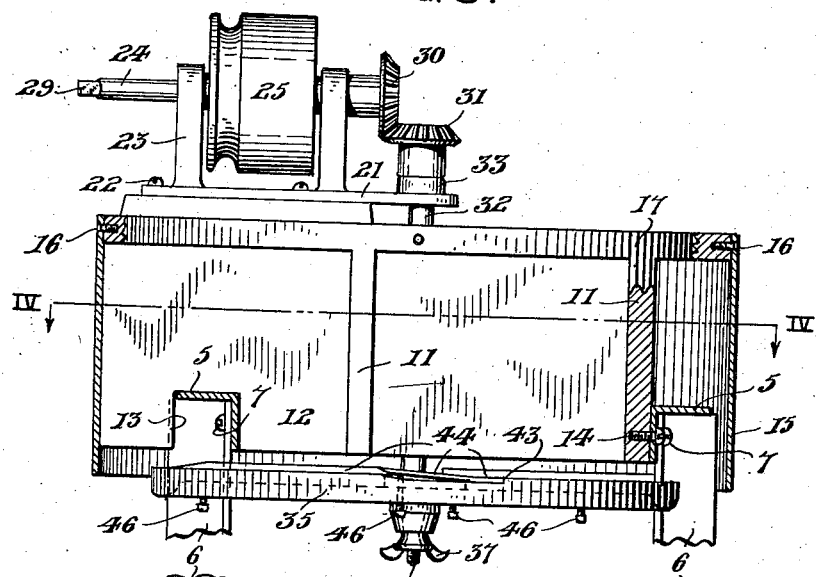
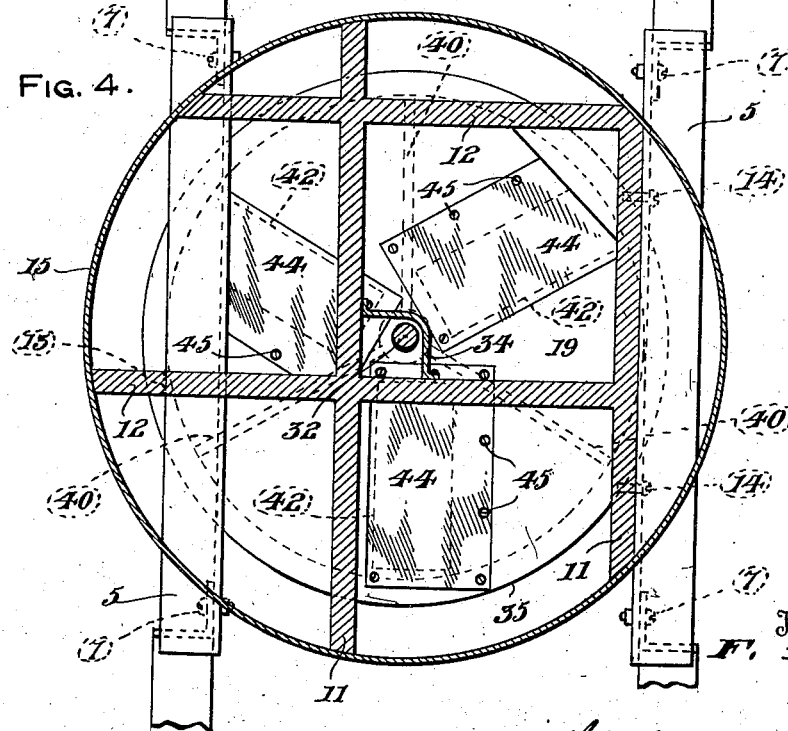
Inventor
F. Turk
By
Attorney

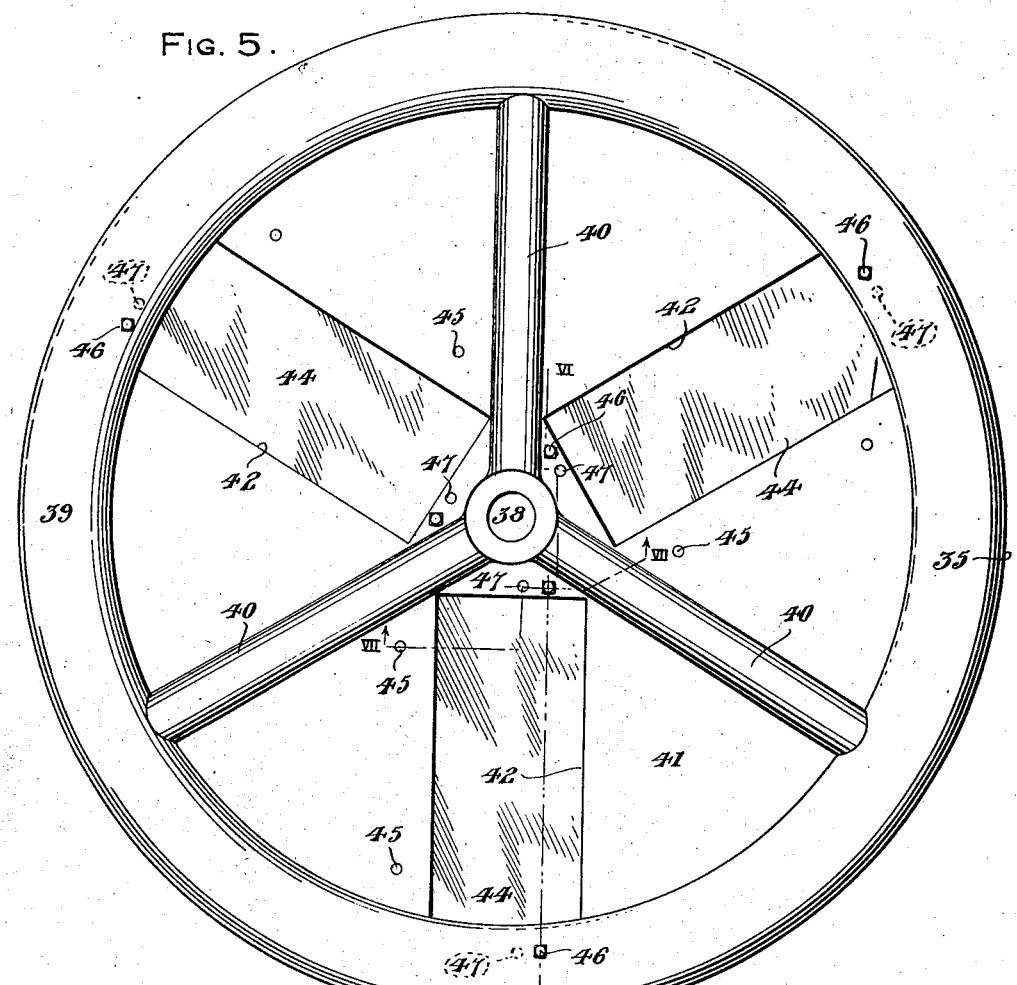

UNITED STATES PATENT OFFICE.

FRANK TURK, OF CASSELMAN, PENNSYLVANIA, ASSIGNOR OF ONE-FOURTH TO FRANK GACNIK, OF JOHNSTOWN, PENNSYLVANIA, AND ONE-FOURTH TO JOSIP HOCEVAR, OF ROCKWOOD, PENNSYLVANIA.

VEGETABLE-CUTTER.

1,351,357.

Specification of Letters Patent. Patented Aug. 31, 1920.

Application filed July 2, 1919. Serial No. 308,137.

*To all whom it may concern:*

Be it known that I, FRANK TURK, a citizen of Jugo-Slavia, residing at Casselman, in the county of Somerset and State of Pennsylvania, have invented certain new and useful Improvements in Vegetable-Cutters, of which the following is a specification.

This invention relates to certain new and useful improvements in vegetable cutters or slicers and is particularly designed for cutting cabbage into shreds for making cold slaw or the like.

The present invention specifically contemplates improvement of that class of vegetable cutters employing a rotary cutter and the primary object is to construct such a vegetable cutter of a more durable and practical nature.

A further object of the invention is to provide a vegetable cutter with a rotary cutter member so constructed as to require the expenditure of very little power in the operation of the same.

With the above general objects in view and others that will become apparent as the nature of the invention is better understood, the same consists in the novel form, combination and arrangement of parts hereinafter more fully described, in connection with the accompanying drawing forming a part of this application and wherein like reference characters indicate similar parts throughout the several views.

Figure 2:
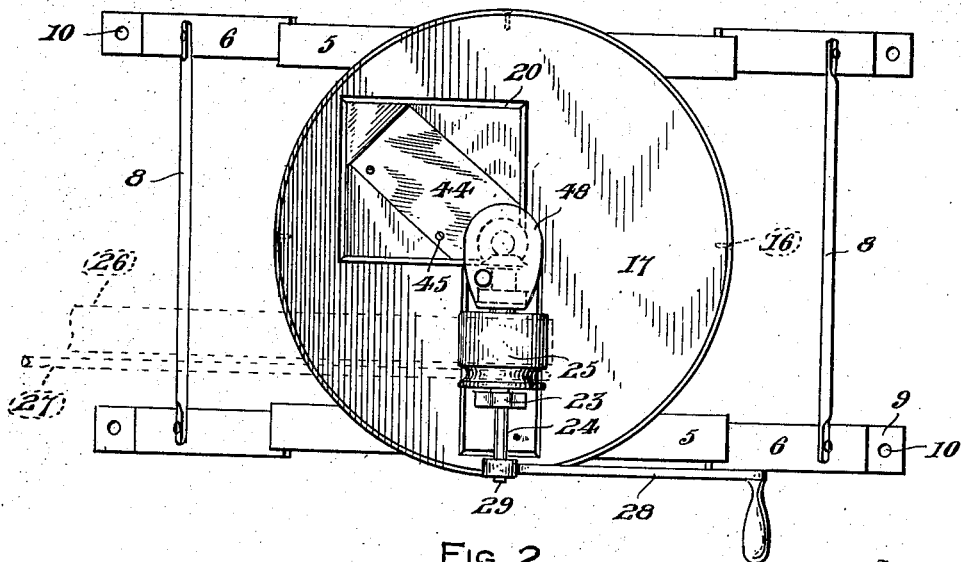

Figure 1 is an elevational view of a vegetable cutter constructed in accordance with the present invention, Fig. 2 is a top plan view thereof, Fig. 3 is an enlarged detail view of the device shown in Fig. 1, parts being removed and broken away and parts being shown in section, Fig. 4 is a horizontal sectional view taken substantially upon line IV—IV of Fig. 3, Fig. 5 is an enlarged bottom plan view of the rotary cutter member detached, Fig. 6 is a sectional fragmentary view taken substantially upon line VI—VI of Fig. 5, and Fig. 7 is a view similar to Fig. 6, taken substantially upon line VII—VII of Fig. 5.

Referring more in detail to the several views, the present invention embodies a stand or supporting frame including a pair of spaced parallel horizontal angle bars 5 disposed with their flanges directed outwardly and downwardly as best shown in Fig. 3. A pair of inclined legs 6 are provided at each side of the supporting stand having their upper ends rigidly secured in any suitable manner as at 7 to the vertical or downwardly extending flanges of the angle bars 5 adjacent the ends of the latter. Each pair of legs 6 are connected by a brace 8 so as to provide a rigid construction and the lower ends of the legs 6 are flanged to provide feet 9 which may be apertured as at 10 for the passage of screws therethrough to secure the device to any suitable support.

A frame, comprising flat vertical crossed members 11 and 12, is arranged upon the bars 5, the members 12 being cut out at their bottom edges as shown more clearly at 13 in Fig. 3 for reception of one of the side bars 5, and the other bar 5 is fastened against the outer face of one of the members 11 at the other side by means of screws 14 or the like. A cylindrical sheet metal case 15 is provided surrounding the frame constituted by members 11 and 12, said casing being rigidly fastened by means of screws 16 or the like at its upper edge to the disk 17 which is rigidly secured or formed upon the members 11 and 12. The disk 17 forms substantially a table or top for the device and the casing 15 is cut out as at 18 at its lower edge for reception of the projecting ends of the bars 5. The arrangement of the bar 5 within the cut out 13 and both of the bars within the cut outs 18 of the casing 15 braces the supporting stand and other parts against strains and make the construction extremely durable.

The members 11 and 12 cross each other in such manner as to provide a rectangular space 19 coincident with the rectangular opening 20 provided eccentrically in the disk 17 for insertion of the cabbage or other vegetable to be cut as will become apparent.

A suitable casting including a base plate 21 is secured upon the disk 17 by means of screws 22 or the like and projecting upwardly from the base 21 are a pair of spaced bearings 23 having an operating shaft 24 journaled horizontally therein. Secured upon the shaft 24 between the bearings 23 is a pulley 25 constructed to either be actuated by a flat belt 26 or a round belt 27 indicated by dotted lines in Fig. 2, it being understood that the belts 26 or 27 may be actuated by any suitable means such as an electric motor located at a distant point. In case motive power is not desirable or obtainable, an operating handle 28 may be removably mounted upon the square outer end 29 of the shaft 24. Shaft 24 has a beveled pinion 30 fastened upon the inner end thereof in mesh with a similar pinion 31 rigidly fastened upon the upper end of a vertical shaft 32 which is journaled in the bearing 33 formed on the base plate 21 before mentioned. The shaft 32 is arranged centrally of the casing 15 and projects through the space 19 at one corner thereof where it is shielded from contact with the vegetable by means of a sheet metal casing 34 which is rigidly fastened to the adjacent members 11 and 12.

A rotary circular cutter 35 formed of some heavy material is fastened upon the lower end of the shaft 32 by any suitable means, being shown herein as accomplished by threading the lower end 36 of the shaft 32 and screwing a nut 37 thereon, after the same has been projected through the hub 38 of the cutter member 35. The cutter member 35 is enlarged or weighted at its periphery as indicated at 39 and strengthened by radial ribs 40 so that when the same is rotated, the momentum thereof will cause its continued rotation for some period after power is removed similar to the action of a fly wheel. The thin or web portion 41 of the cutter member 35 is apertured at suitable intervals as at 42 and is cut out as at 43 adjacent one longitudinal edge of each opening 42 for reception of the cutter knives 44 as shown in Fig. 7. The cutter knives 44 overlie the openings 42 and are secured within the cut outs 43 by means of screws 45 or the like. Suitable adjusting screws 46 are threaded through the cutter member 35 and bear against the forward portions of the cutter knives 44 so as to maintain the same spaced from the web 41 a required distance. It is obvious that by adjusting the screws 46, the thickness of cut may be varied as required. Screws 47 are extended through the knives 44 adjacent the set screws 46 to prevent the latter from bending the cutter knives 44 at a point too far removed from the cutting edges thereof.

The cutter member 35 is arranged horizontally directly beneath the lower edges of the frame members 11 and 12 so that when said cutter member is rotated, the knives 41 traverse the space 19 and thereby slice the cabbage or other vegetable as the same is fed downwardly through the opening 20 in the disk 17. As shown in Fig. 2, the gears 30 and 31 may be shielded by a suitable gear casing 48.

In operation, power is applied to shaft 24 in any suitable manner in order to rotate the cutter member 35 through the gearing 30 and 31 and the operator places the vegetable to be cut within the space 19 by introducing the same through the opening 20 in the disk 17. As the knives rotate or traverse the space 19, the vegetable is sliced or cut and drops through the openings 42 into any suitable form of receptacle which may be disposed beneath the cutter member 35.

It is believed that the construction and operation as well as the advantages of the present invention will be readily understood by those skilled in the art from the foregoing description and while the form of the invention herein shown and described is what is believed to be the preferable embodiment thereof, it is nevertheless to be understood that minor changes may be made therein without departing from the spirit and scope of the invention as claimed.

What I claim as new is:—

A vegetable cutter comprising a pair of spaced horizontal parallel bars, supporting legs secured at their upper ends to the ends of said bars, a frame comprising crossed spaced flat vertical members, one of said bars lying flatly against the outer face of one of said crossed members and rigidly secured to the latter, another of said crossed members being cut out at its lower edge for reception of the other bar therein, a cylindrical casing surrounding said frame and contacting the ends of the crossed members thereof, said casing being also cut out at its lower edge for reception of the ends of said bars, said crossed members of the frame providing an open space for the introduction of a vegetable to be cut, a disk upon said crossed members having an opening therethrough coincident with said space, a horizontal rotary cutter member operatively positioned adjacent the lower edges of the crossed members, and means to rotate said cutter member for causing the vegetable to be cut as the same is fed downwardly through said space.

In testimony whereof I affix my signature.

FRANK TURK.